SUBSCRIPTION TELEVISION SYSTEM HAVING GENERATION OF SYNCHRONIZING SIGNALS AT THE RECEIVER

Filed June 26, 1961 6 Sheets-Sheet 1

INVENTORS
Murray Salit
Helias Doundoulakis
BY
Michael S. Striker
Attorney

SUBSCRIPTION TELEVISION SYSTEM HAVING GENERATION OF SYNCHRONIZING SIGNALS AT THE RECEIVER

Filed June 26, 1961 6 Sheets-Sheet 2

INVENTORS
Murray Salit
Helias Doundoulakis
BY
Michael S. Striker
Attorney

INVENTORS
Murray Salit
Helias Doundoulakis
BY
Michael S. Striker
Attorney

INVENTORS
Murray Salit
Helias Pourdoulakis
BY
Michael S. Striker
Attorney

March 22, 1966 M. SALIT ETAL 3,242,258
SUBSCRIPTION TELEVISION SYSTEM HAVING GENERATION
OF SYNCHRONIZING SIGNALS
AT THE RECEIVER
Filed June 26, 1961 6 Sheets-Sheet 5

INVENTORS
Murray Salit
Helias Doundoulakis
BY
Michael S. Striker
Attorney

March 22, 1966 M. SALIT ET AL 3,242,258

SUBSCRIPTION TELEVISION SYSTEM HAVING GENERATION OF SYNCHRONIZING SIGNALS AT THE RECEIVER

Filed June 26, 1961 6 Sheets-Sheet 6

INVENTORS
Murray Salit
Helios Doundoulakis
BY
Richard S. Striker
Attorney

United States Patent Office 3,242,258
Patented Mar. 22, 1966

3,242,258

SUBSCRIPTION TELEVISION SYSTEM HAVING GENERATION OF SYNCHRONIZING SIGNALS AT THE RECEIVER

Murray Salit, New York, and Helias Doundoulakis, Brooklyn, N.Y., assignors to Teleglobe Pay-TV System, Inc., New York, N.Y., a corporation of New York
Filed June 26, 1961, Ser. No. 119,384
4 Claims. (Cl. 178—5.1)

The present invention relates to a television communication system. More particularly, the invention relates to a television communication system which provides for secret transmission of video and audio signals.

The principal object of the present invention is the provision of a secret television communication system.

An object of the present invention is the provision of a television communication system which may be utilized for normal transmission or for secret transmission.

An object of the present invention is the provision of a secret television communication system providing for line transmission of the audio signal.

Another object of the present invention is the provision of a secret television communication system providing for transmission of a distorted video signal.

Another object of the present invention is the provision of a secret television communication system adapted to utilize existing transmitting and receiving equipment without the necessity of expensive or extensive modification of such equipment.

Another object of the present invention is the provision of a secret television communication system providing for the distortion of the video signal before transmission from the transmitter and the reinstatement of the video signal after detection at the receiver.

Another object of the present invention is the provision of a secret television communication system providing for transmission of a distorted video signal without disturbing normal transmitter operation.

Another object of the present invention is the provision of a secret television communication system utilizing simple means for providing a distorted video signal for transmission.

Another object of the present invention is the provision of a secret television communication system utilizing the suppression of the horizontal synch signal for providing a distorted video signal for transmission.

Another object of the present invention is the provision of a secret television communication system utilizing simple means for reinstating a transmitted distorted video signal.

Another object of the present invention is the provision of a secret television communication system utilizing production of the horizontal synch signals at the receiver for reinstating a transmitted distorted video signal.

Another object of the present invention is the provision of a secret television communication system providing for reinstatement of a transmitted distorted video signal without disturbing normal receiver operation.

Another object of the present invention is the provision of a secret television communication system which entails simple connection of the encoding and decoding components to existing equipment with a minimum of inconvenience to the user or subscriber and to the transmitting station.

Another object of the present invention is the provision of a secret television communication system providing for the transmission of signals from each of a plurality of receivers to a recording station.

Another object of the present invention is the provision of a secret television communication system especially suited for educational purposes.

Another object of the present invention is the provision of a secret television communication system utilizing phase shifting means for providing a distorted video signal for transmission.

Another object of the present invention is the provision of a secret television communication system utilizing phase reversal means for providing a distorted video signal for transmission.

Another object of the present invention is the provision of a secret television communication system utilizing phase shifting means for reinstating a transmitted distorted video signal.

Another object of the present invention is the provision of a secret television communication system utilizing phase reversal means for reinstating a transmitted distorted video signal.

Another object of the present invention is the provision of a secret television communication system utilizing phase reversal means at the second picture detector stage of the receiver for providing for reinstatement of a transmitted distorted video signal.

Another object of the present invention is the provision of a secret television communication system utilizing decoding means connected between the output of the audio detector and the second picture detector in the receiver.

Another object of the present invention is the provision of a secret television communication system utilizing decoding means connected between the antenna and the receiving means of the receiver.

Still another object of the present invention is the provision of a secret television communication system which is reliable and efficient, although of simple structure, in operation.

In accordance with the present invention, the television system comprises transmitting means for transmitting a video signal, the transmitting means including transmitter audio means for simultaneously transmitting an audio signal of a frequency within the audible frequency range synchronized with the video signal. Transmitter encoding means suppresses horizontal synchronizing signals and replaces the horizontal synchronizing signals with a key signal so as to distort the video signal transmitted by the transmitting means. The transmitter encoding means further distorts the video signals transmitted by the transmitting means by including transmitter phase shifting means for phase shifting the electrical phase of the video signal before transmission. Receiving means receive and reproduce the video signal and the key signal, the receiving means including receiver audio means for receiving and reproducing the audio signal in synchronism with the video signal. Receiver decoding means reconstitutes the horizontal synchronizing signals from the received key signal so as to nullify the effect of the encoding means and provide in the receiving means a video signal including the horizontal synchronizing signals. The receiver decoding means further includes receiver phase shifting means for shifting the electrical phase of the received video signal so as to nullify the effect of the transmitter phase shifting means.

In one embodiment of the present invention, wire means are provided and are adapted to interconnect the transmitting and receiving means. Transmitter control means connect the transmitter encoding means to the transmitting means so as to distort the video signal transmitted thereby and simultaneously apply a control signal to one end of the wire means and supply the audio signal produced by the transmitter audio means to the one end of the wire means. Receiver control means are connected to the other end of the wire means and are actuated by the control signal for connecting the receiver decoding means to the receiving means so as to reinstate in the receiving means an undistorted video signal and simultaneously to derive the audio signal produced by the transmitter audio means from the other end of the wire means and to supply the audio signal to the receiver audio means.

In another embodiment of the present invention, the key signal comprises a substantially sinusoidal wave shape and the decoding means comprises waveshaping means for converting the substantially sinusoidal key signal into horizontal synchronizing pulses, the decoding means having an input connected to a common point between the audio detecting means and the audio signal reproducing means and an output connected to the second picture detecting means of the receiver.

In another embodiment of the present invention, the key signal comprises a substantially sinusoidal wave shape transmitted with an audio signal and modulated on an audio signal carrier, and the decoding means comprises means for deriving the key signal from the audio signal carrier, means for deriving the audio signal from the audio signal carrier, waveshaping means for converting the substantially sinusoidal key signal into horizontal synchronizing pulses, means for modulating a received video signal with the horizontal synchronizing pulses to provide a resultant video signal, means for modulating a second audio signal carrier with the derived audio signal to provide a resultant audio signal, and means for applying the resultant video and audio signals to the receiving means through phase shifting means; the decoding means having an input connected to the antenna and an output connected to the receiver.

In accordance with another feature of the present invention, recording means is connected to the wire means and signalling means is connected to the other end of the wire means for supplying signals to the recording means for recording thereby.

In order that the present invention may be readily carried into effect, it will now be described with reference to the accompanying drawings, wherein.

The circuitry and/or components of any of the blocks shown in FIGS. 3, 4, 5, and 7 is well known in the art and is fully shown and described in any suitable textbook on television or communication engineering, such as, for example, "Principles of Television Engineering" by Donald G. Fink, McGraw-Hill Book Co., Inc., 1940, or "Radio Engineering Handbook," Keith Henney, Editor-in-Chief, 4th Edition, McGraw-Hill Book Co., Inc., 1950, Chapter 19 on Television by Donald G. Fink, pages 995 to 1050.

The geometric fidelity of the reproduction of the picture in a TV system depends upon the exact correspondence in position of the scanning spot at the transmitter and receiver. This correspondence requires that the periodicity and phasing of the horizontal and vertical scanning motions at the two termini, that is, at the transmitter and at the receiver of the television communication system, be alike. Suitable signals are transmitted which indicate the beginning of each frame (or field repetition in the case of interlaced scanning) and the beginning of each line. These synchronizing signals are part of the complete video signal, and occur during time not utilized by the picture signal itself, that is, during the interval in which the scanning spot is returning to its original position, after completing a line or field traversal. In terms of the frequency spectrum of the picture signal, the frequency components are multiples of line and frame frequency, their phase and amplitude being such that they have no effect on the picture except around the edges where they form a narrow border which cannot be used for the image and which, in cathode ray terminal tubes, has no real existence.

Scanning in the case of electronic terminal tubes is produced by deflecting an electron stream periodically in two mutually perpendicular directions by means of suitably varying magnetic or electrostatic fields. The current or voltage producing these fields is supplied from two deflection generators, one operating at line frequency, the other at frame or field frequency. Each generator is controlled by its own synchronizing impulse; therefore, the complete signal must include two types which can be distinguished from one another by some form of selector circuit. It is usual to make the generator producing the synchronizing impulses at the transmitter the fundamental timing unit of the entire system. Thus, the synchronizing signal governs not only the scanning pattern at the reproducer, but also that at the pickup as well. The exact shape of the impulses for horizontal and vertical synchronizing depends upon how the signal is applied at the deflection generator and upon the circuits which separate the two components. Experience has prompted the almost universal adoption of synchronizing impulses which are "blacker than black"; that is, the blanking level corresponds to black in the video signal and the impulses extend below this level in the direction of black.

Figure 1:
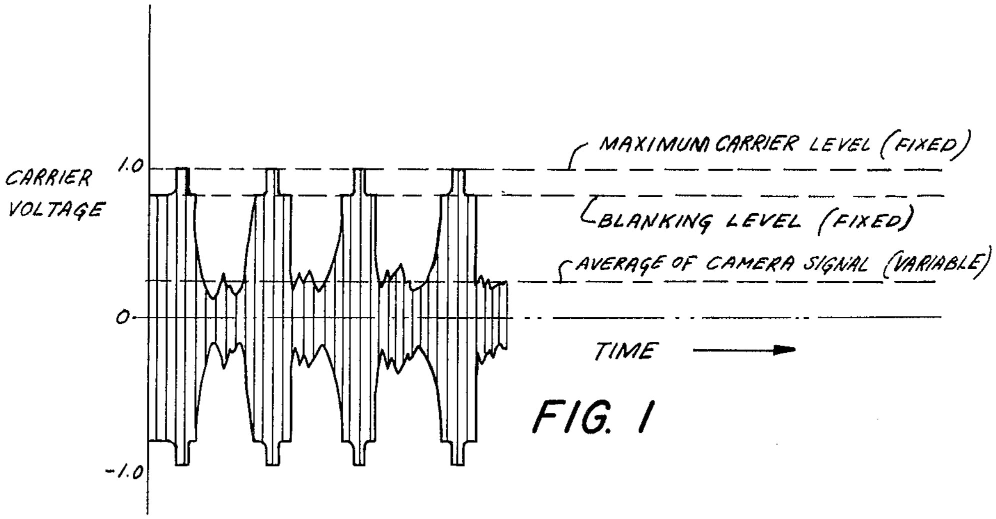
FIG. 1 is a graphical presentation of a modulated TV carrier signal clearly indicating the horizontal synchronizing pulses.
Figure 2:
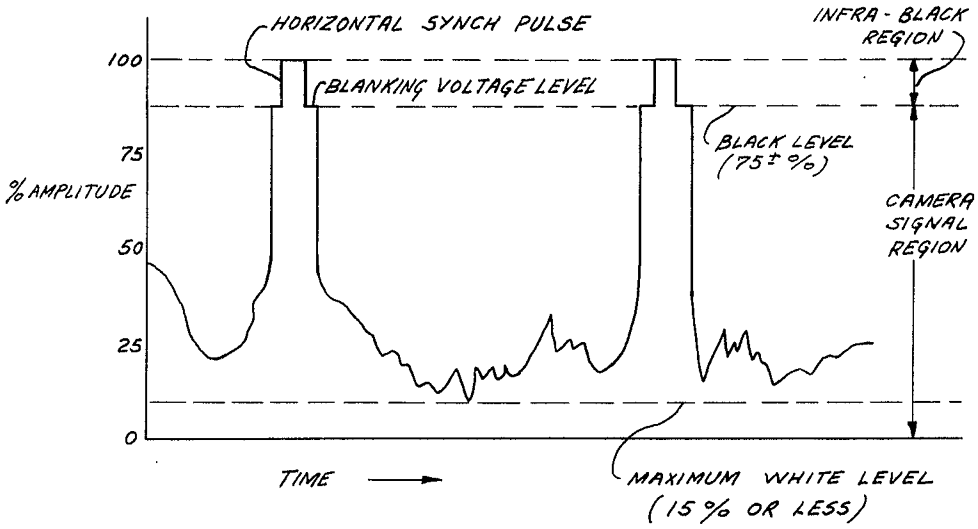
FIG. 2 is a graphical presentation of the details of the modulation envelope of a TV carrier signal clearly indicating the horizontal synchronizing pulses.

The standard form of horizontal synchronizing pulse is shown in FIGS. 1 and 2. The function of the horizontal synchronizing pulses is to trigger an oscillator in order to bring the electron beam from the right-hand side of the screen to the left-hand side. Once the beam is on the left-hand side, the oscillator is no longer directly under the control of a pulse and goes about its usual function of sweeping the beam across the screen. Thus, each horizontal synchronizing pulse that precedes the line detail sets up the beam in readiness for the scanning out of this information. The next pulse arrives when the beam is at the far right-hand side of the screen, at the very end of the line. In similar manner, the vertical pulses serve the purpose of bringing the electron beam back to the top of the screen for the beginning of each field. The construction of the video signal is clearly shown with its synchronizing pulses in FIGS. 1 and 2. In FIGS. 1 and 2, several lines of an image are shown complete with the detailed information, blanking voltages, and horizontal synchronizing pulses. The blanking and synchronizing voltages occupy approximately 20% to 25% of the total signal amplitude. Notice that the blanking voltage retains its control over the cathode ray tube grid for sometime before and after each horizontal synchronizing pulse. This is done to make certain that no beam retrace is visible at all on the screen. As soon as the blanking voltage retains control of the grid, the line detail becomes active once more. All the lines of one field follow this form, the only difference occurring in the camera detail of the various sections of the image. At the end of the last horizontal line it is necessary to insert a vertical impulse that will bring the beam back to the top of the screen again. During the period that the vertical pulse is active, it is imperative that the horizontal oscillator should not be neglected. For, should this occur, the horizontal generator probably would slip out of synchronization. To avoid this occurrence, the horizontal synchronizing impulses are sent with the vertical pulse.

When the video signal is imposed on a carrier wave, the envelope of the modulated carrier wave constitutes the video signal wave form. Such a modulated picture carrier and the details of the envelope are shown in FIG. 1. In the FCC standard video signal, as shown in FIGS. 1 and 2, the carrier amplitude is divided by the blank level (blanking level or pedestal) at 75±2.5% of the maximum amplitude. The amplitude region above the black level is called the infrablack region and is occupied by the synchronizing signals. Signal levels in this region do not produce light in the received image. The synchronizing signals are of two types: horizontal signals for initiating the motion of the scanning agent along each horizontal line, and vertical signals (not shown in the figs.) for initiating the motion of the scanning agent vertically at the beginning of each field. The peak amplitude of the wave, the height of the synchronizing pulses, and the black level amplitude are maintained constant throughout each broadcast. The portion of the carrier envelope extending below the black level is called the camera signal. The polarity of transmission in the FCC standard is negative; that is, an increase in the light on the camera plate results, for example, in a decrease in the carrier amplitude as shown in FIGS. 1 and 2. The maximum white level is 15% or less of the maximum carrier amplitude. Intermediate grey tones exist between the maximum white level and the black level.

Figure 3:
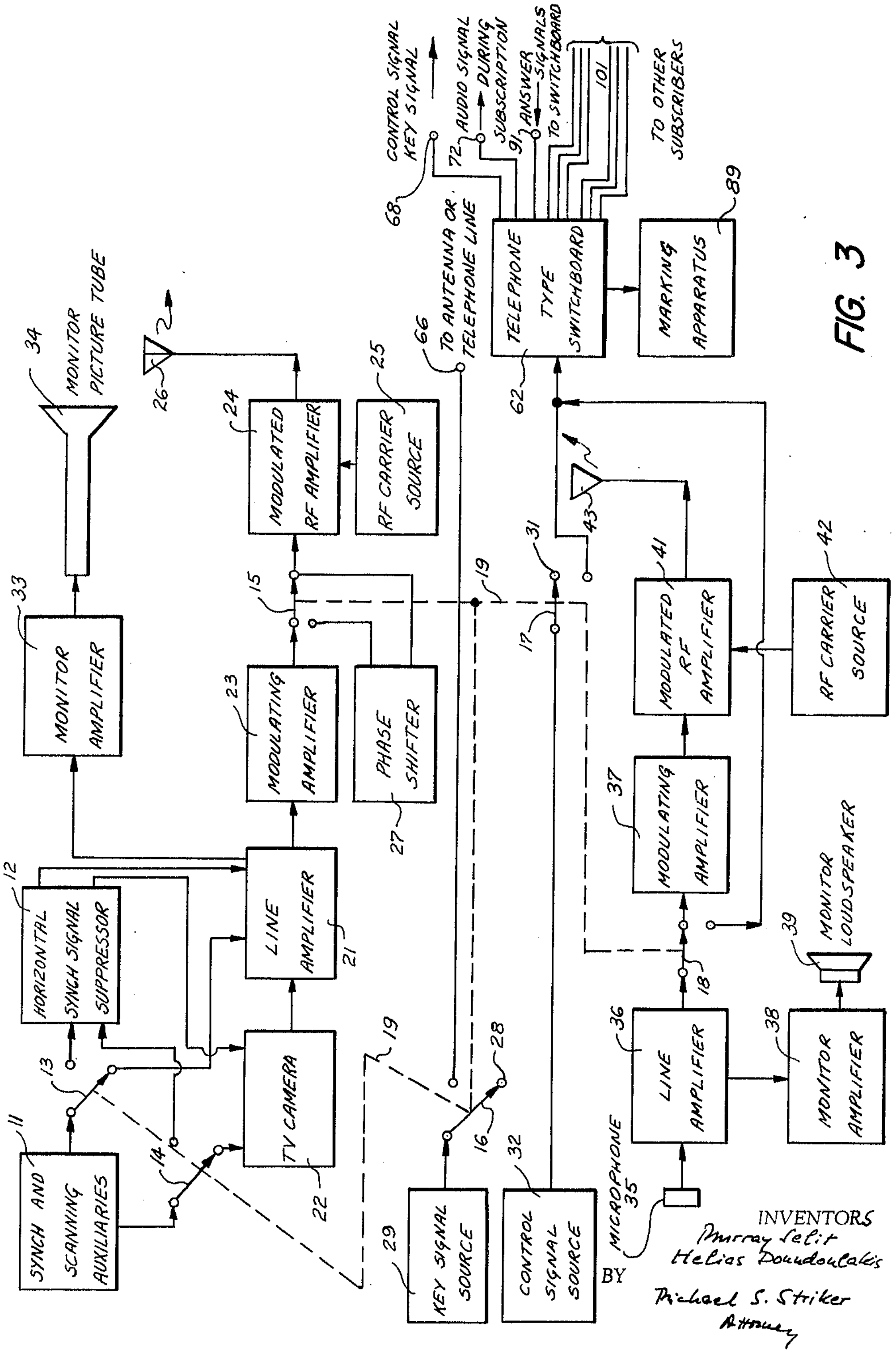
FIG. 3 is a schematic circuit block diagram of an embodiment of a transmitting station of the television communication system of the present invention.

In FIG. 3, synch and scanning auxiliaries 11 produce an output which comprises horizontal and vertical synchronizing signals. The horizontal synchronizing signals produced by the synch and scanning auxiliaries 11 are suppressed in a horizontal synch signal suppressor 12, when so desired, by switch means comprising first and second armatures 13 and 14, respectively. The switch means comprises, besides the first and second armatures 13 and 14, third, fourth, fifth and sixth armatures 15, 16, 17 and 18, all six armatures being ganged, as indicated by the dotted lines 19, so that they operate in unison and so that each is in one of two positions at one time and each is in the other of the two positions at another time.

Thus, during normal transmission of the video signal, without distortion, the first armature 13 is moved by manual operation of the switch means to a position whereby the synch and scanning auxiliaries 11 are directly connected to a line amplifier 21. The second armature 14 of the switch means is, when the first armature 13 connects the synch and scanning auxiliaries 11 to the line amplifier 21, in a position wherein it connects said synch and scanning auxiliaries to a TV camera 22. The video signal produced by the line amplifier 21 is amplified by a modulating amplifier 23. The third armature 15 is moved by manual operation of the switch means to a position whereby the modulating amplifier 23 is directly connected to a modulated RF amplifier 24 so that the video signals modulated by said modulated RF amplifier on a suitable carrier produced by an RF carrier source 25 and the modulated video signal is then transmitted by means of antenna means 26. During the normal transmission of a normal video signal neither the horizontal synch signal suppressor 12 nor a phase shifter 27 is connected into the transmitting circuit, so that normal operation is not adversely affected.

The fourth and fifth armatures 16 and 17 of the switch means are, when the first and second armatures are in the positions shown in FIG. 3, in positions wherein the fourth armature 16 is connected to a blank terminal 28 so that a key signal provided by a suitable key signal source 29 is not fed to any of the circuitry of FIG. 3 and is therefore ineffective and the fifth armature 17 is connected to a blank terminal 31 so that a control signal provided by a suitable control signal source 32 is not fed to any of the circuitry of FIG. 3 and is also ineffective.

A monitor amplifier 33 produces an output which is fed to a monitor picture tube 34 which reproduces the picture seen by the TV camera 22, which picture is presumably reproduced at the receiver.

A microphone 35 picks up sound and produces an output which is fed to a line amplifier 36. The line amplifier 36 produces an audio signal which is fed to a modulating amplifier 37 and to a monitor amplifier 38. The output of the monitor amplifier 38 is fed to a monitor loudspeaker 39 which reproduces the sound picked up by the microphone and which is presumably reproduced by the loudspeaker at the receiver. The modulating amplifier 37 produces an audio signal which is fed to a modulated RF amplifier 41 which receives a carrier from an RF carrier source 42 and which modulates said carrier with said audio signal. The modulated audio signal is then transmitted through antenna means 43. The line amplifier 36 is connected to the modulating amplifier 37 through the sixth armature 18 of the switch means and during normal transmission said sixth armature is in the position shown in FIG. 3, thereby permitting said line amplifier to be directly connected to said modulating amplifier so that the audio signal is transmitted through the antenna 43.

Figure 4:
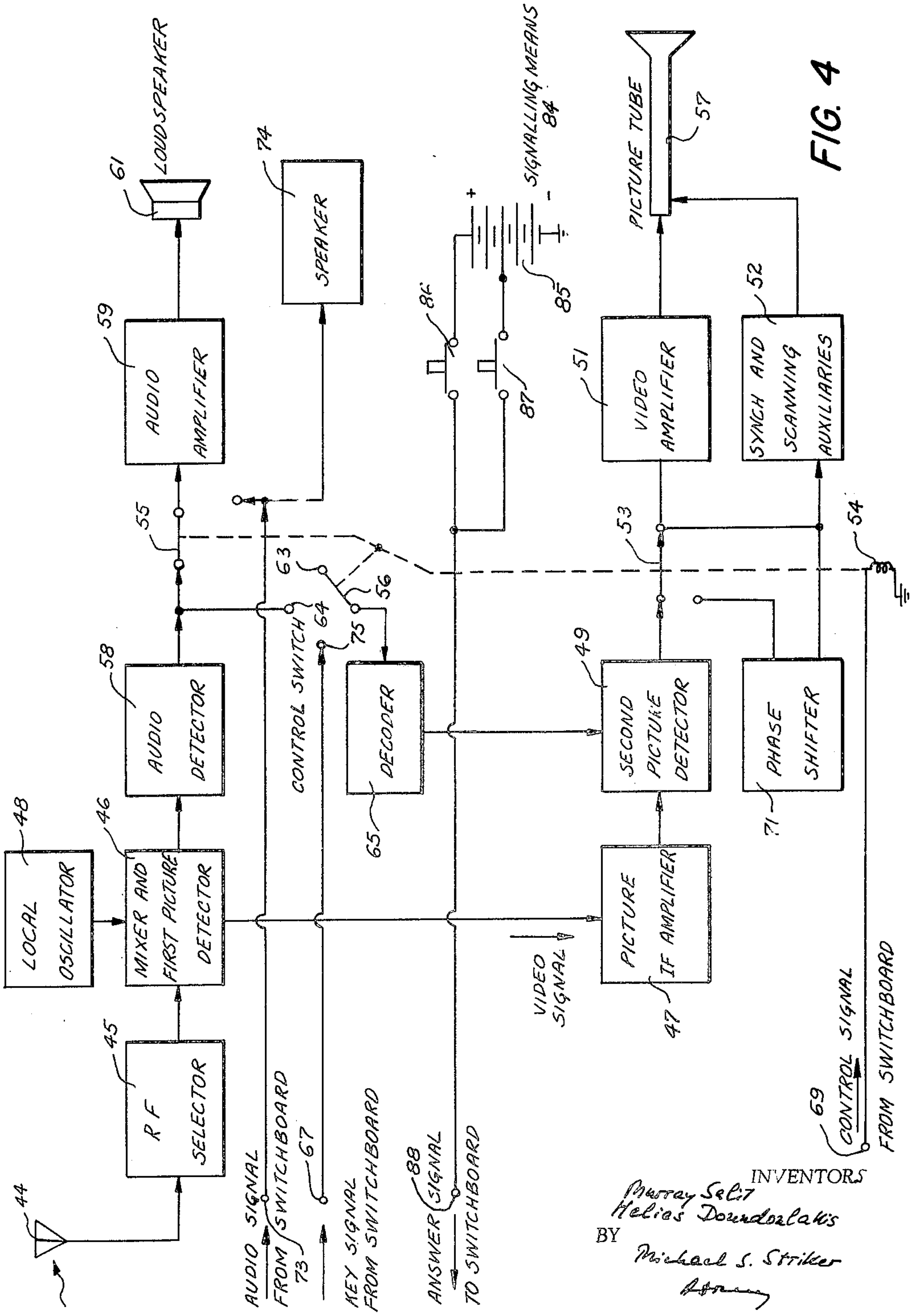
FIG. 4 is a schematic circuit block diagram of an embodiment of a receiving station of the television communication system of the present invention.
Figure 5:
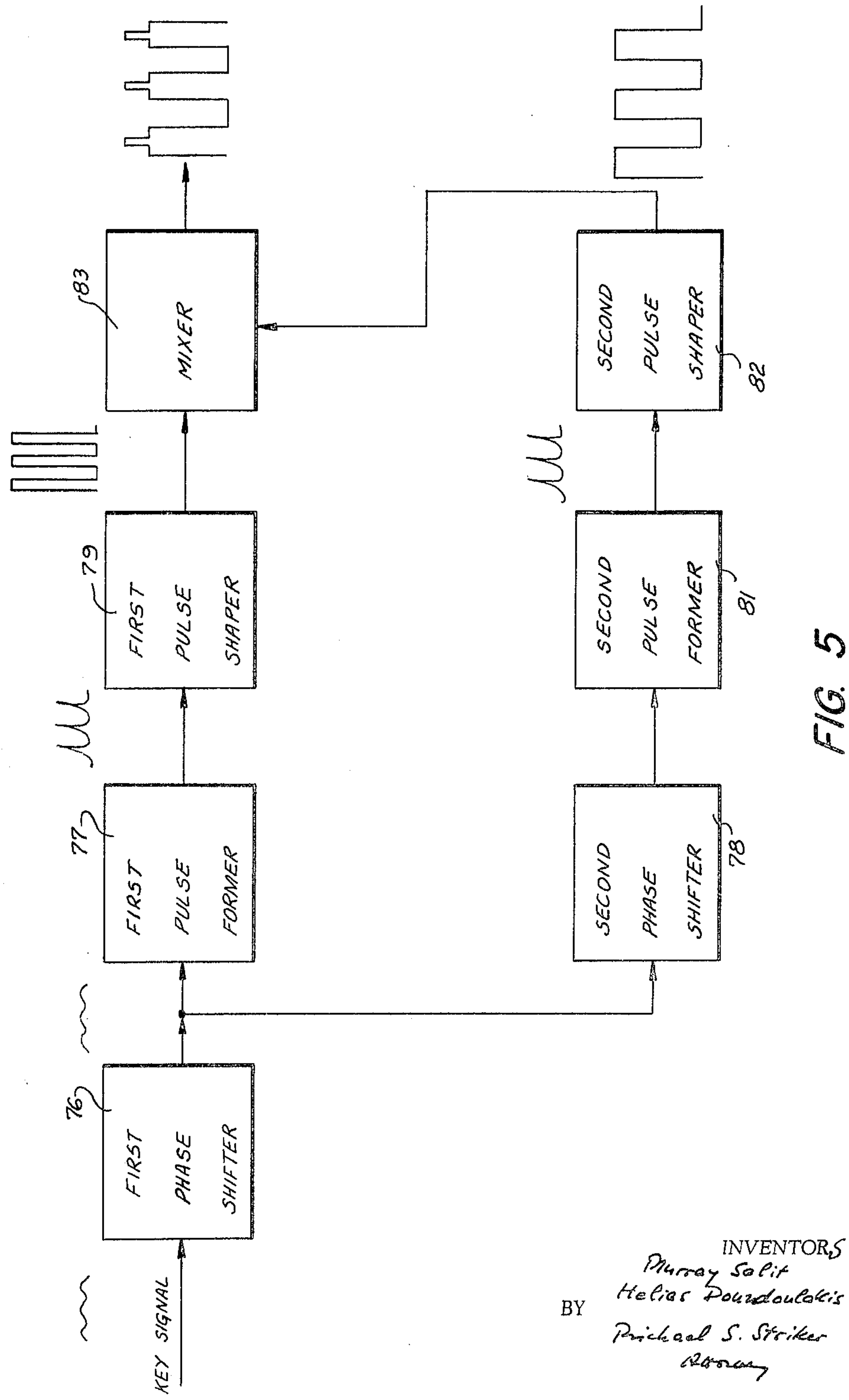
FIG. 5 is a schematic circuit block diagram of an embodiment of decoding means which may be utilized in the embodiment of FIG. 4.

The video signal transmitted by the antenna 34 and the audio signal transmitted by the antenna 43, of the transmitting station of FIG. 3 are received by an antenna 44 of the receiving station of FIG. 4 and are applied to an RF selector 45 which provides an output to a mixer and first picture detector 46. The mixer and first picture detector 46 separates the video and audio signals and applies the video signal to a picture IF amplifier 47. The mixer function is aided by a local oscillator 48 which feeds the mixer and first picture detector 46. The output of the picture IF amplifier 47 is fed to a second picture detector 49. The output of the second picture detector 49 is fed to a video amplifier 51 and to synch and scanning auxiliaries 52 through a first armature 53 of a control relay winding 54 which, when in its deenergized condition, causes the first armature 53, a second armature 55 and a third armature 56 to be in the positions shown in FIG. 4. Thus, during normal transmission operation of the system, the output of the second picture detector 49, which is the video signal with which the transmitted video carrier has been modulated, if fed through the first armature 53 to the video amplifier 51 which produces an output which is fed to a picture tube 57 of the receiver which reproduces the picture seen by the TV camera 22 of the transmitting station due to the control of said picture tube by the synch and scanning signals produced by the synch and scanning auxiliaries 52; the output of the second picture detector 49 being fed to said synch and scanning auxiliaries through said first armature during normal transmission.

During normal transmission the audio output of the mixer and first picture detector 46 is fed to an audio detector 58 which produces an output which is fed to an audio amplifier 59 through the second armature 55 of the control relay means 54, which second armature is then in the position shown in FIG. 4. The audio amplifier 59 then feeds a loudspeaker 61 which reproduces the sound originally picked up by the microphone 35 of the transmitter station and transmitted by carrier from the antenna 43 of the transmitting station to the antenna 44 of the receiving station.

Thus, during normal operation of the system of the present invention a video signal containing horizontal and vertical synchronizing pulses or signals and an audio signal will be produced in the usual manner, transmitted in the usual manner and received and reproduced in the usual manner, as described in the aforementioned texts, so that during normal operation of the system of the present invention a normal TV transmission and reception takes place. However, the secret television communication system of the present invention is especially adapted for use as a confidential, closed-type system, or educational subscription type system. The system of the present invention is also adapted for audience participation or home subscriber programming, and in order to provide such operation the control switch means at the transmitting station and the control switch means at the receiving station are put into operation.

If a closed-type or subscriber-type system is desired, wherein a subscriber wishes to receive a program which is not available to non-subscribers, the subscriber may indicate by phone call or other suitable means, such as, for example, by dialing a code number, that he wishes to receive a special program. Suitable means may be provided at his receiver for indicating payment for his subscription, such as, for example, a receptacle for coins, tokens, punched cards, etc. The means for payment of the subscription may, by suitable means, also be utilized to notify the transmitting station that the subscriber is ready to receive the special program.

In accordance with the present invention, a selected subscriber, who may be one of several hundreds of thousands of such subscribers and who wishes to view special closed circuit television programs on occasion, is connected and/or has his receiver connected by telephone communicating type lines directly to a telephone type switchboard 62, shown in FIG. 3 in schematic form. Thus, each of the subscribers may have his receiver directly connected to a line identified with him which is fed to the telephone type switchboard 62. The switchboard 62 preferably comprises an automatic telephone type switchboard such as produced by the General Telephone Company and which functions to provide desired line connections at desired times in the manner of known automatic switchboards. Thus, if a subscriber wishes to receive a special program for which he will pay or be billed, and in which he wishes to participate, he has merely to call in a signal to the switchboard 62 or to close the suitable manual control switch (which is then moved to its position other than that shown in FIG. 4) at his set to said switchboard which will alert the switchboard that such reception is desired. Of course, he may indicate in some other suitable manner that he is desirous of receiving a subscription program.

A number of receivers may be connected to a party line in a manner similar to the General Telephone Company party line system, each receiver on the party line being identifiable from the others, such as, for example, by being assigned its own predetermined resonant frequency and having a resonant circuit responsive to such assigned frequency.

The operation of the switch means at the transmitting station insures that the subscribers receive the program transmitted on a closed circuit basis. Thus, when a special program is to be transmitted, the transmitter control operator will initiate the transmission by operation of the transmitter control or transmitter switch means. The switchboard 62 is aware that identified subscribers are ready to receive the special program and have paid their required subscription fees or have been accordingly billed in suitable manner, since it has been alerted by signals from the subscribers' receivers. Such alerting signals may have been provided directly by coin receiving means or punched card means available at the receiver of the subscriber. At any rate, when the special program is to be transmitted, the operator of the transmitting station operates the switch means to move the first armature 13 to the other position from that shown in FIG. 3, to move the second armature 14 to the other position from that shown in FIG. 3, to move the third armature 15 to the other position from that shown in FIG. 3, to move the fourth armature 16 to the other position from that shown in FIG. 3, to move the fifth armature 17 to the other position from that shown in FIG. 3 and to move the sixth armature 18 to the other position from that shown in FIG. 3 and thereby institute the closed circuit secret television communication system in accordance with the objective of the present invention.

At the time that the subscriber closes the receiver control switch to the switchboard 62 to advise the switchboard that he wishes to receive the audio signals which may be transmitted over the telephone lines by means of the telephone system including said telephone type switchboard, he also operates the third armature 56 of the control switch means to move said third armature from a blank terminal 63, which is contacted by said third armature during normal transmission, to a first subscription terminal 64 which connects a decoder 65 into the circuit. The receiver control switch may be closed by the coin or punch card machine at the receiver of the subscriber and is preferably operated by the relay control means 54 energized by a control signal received through the switchboard means 62 from the transmitter or sent to the receiver in any suitable manner.

When the first armature 13 is moved to its other position from that shown in FIG. 3 and when the second armature 14 is moved to its other position from that shown in FIG. 3, they apply the output of the synch and scanning auxiliaries 11 to the horizontal synch signal suppressor 12 which comprises any suitable type of signal suppressor, such as, for example, a filter which will filter out the horizontal synch signals, or a suitable switch means which will switch the horizontal synch signal generator out of the circuit. The output of the horizontal synch signal suppressor 12 is then supplied to the TV camera 22 and to the line amplifier 21 so that a distorted video signal is produced by said line amplifier due to the lack of horizontal synch signals. The distorted video signal, lacking horizontal synch signals, is then fed through the modulating amplifier 23 to the third armature 15.

When the third armature 15 is moved to its other position it applies the output of the modulating amplifier 23, which is the video signal, to the phase shifter 27 which comprises any suitable type of phase shifter, such as, for example, a resistance-capacitance, resistance-inductance, resistance-capacitance-inductance, or electron tube circuit having components of values, permitting it to shift the electrical phase of the video signal any desired amount, but which in a preferred embodiment of the invention shifts the video signal 180°, or reverses or inverts its phase. The output of the phase shifter 27 is then supplied to the modulated RF amplifier 24 and modulates the carrier supplied to said modulated RF amplifier by the RF carrier source 25 so that a doubly distorted video signal is transmitted by the antenna 26. Thus, any non-subscriber, whose receiver is in its normal condition, will merely see a distorted garble on his screen instead of a picture. Furthermore, the audio may be transmitted to non-subscribers and be used to advertise the programs being transmitted or to induce the non-subscribers to subscribe to the service. The audio may also be used to advise the non-subscribers that their sets are in order but that there is no picture due to the transmission of a subscription program. Since the first, second and third armatures 13, 14 and 15 are ganged, so that they move together, the manual operation of a master switch of the transmitter control means will cause all three armatures to move in unison.

The fourth armature 16 will move from the blank terminal 28, which is contacted by said fourth armature during normal transmission, to its other terminal and thereby causes the key signal produced by the key signal source 29 to be supplied either to a selected one of the antennae 26 and 43 or to the switchboard 62. The fifth armature 17 will move from the blank terminal 31, which is contacted by said fifth armature during normal transmission, to its other terminal and thereby causes the control signal produced by the control signal source 32 to be supplied to the switchboard 62, which has a plurality of telephone lines extending therefrom, each of said lines or each group of said lines respresenting a specific subscriber and leading to the receiver of said subscriber. The key signal then appears at a key signal terminal 66 of the transmitter and is supplied to the subscriber's receiver either through said key signal terminal, the telephone line and a key signal terminal 67 at said receiver, or through the antenna 44 of said receiver, so that the subscriber desiring to receive the special program receives said key signal at his set. The control signal then appears at a control signal terminal 68 of the transmitter and is supplied to the subscriber's receiver through the telephone line and a control signal terminal 69 at said receiver, so that the subscriber desiring to receive the special program receives both the key signal and the control signal at his set.

The sixth armature 18, when moved to its other position, feeds the output of the line amplifier 36 directly to the switchboard 62. The audio signal which is thus applied from the line amplifier 36 is then transmitted through the telephone system comprising the switchboard 62 and the telephone lines by means of said switchboard to the subscriber's receiver. Thus, during transmission of the closed circuit program, all the audio is transmitted directly by wire so that it cannot be received by non-subscribing receivers and the video is transmitted in doubly distorted form so that it cannot be reproduced by non-subscribing receivers.

When the control signal at the terminal 68 at the transmitter is transmitted through the telephone line and appears at the control terminal 69 at the other end of the telephone line it is received by the control relay means 54 and such relay means is energized. When the relay means 54 is energized it causes the first, second and third armatures 53, 55 and 56 to move to their positions not shown in FIG. 4. Thus when the first armature 53 is moved to its other position it supplies the output of the second picture detector 49, which during subscription is a distorted video signal, to the input of a receiver phase shifter 71 which is essentially identical with the transmitter phase shifter 27 and which serves to again reverse the phase of the received distorted video signal. That is, the phase of the signal supplied to the phase shifter 71 is shifted by the same amount that the phase shifter 27 at the transmitting means shifted the video signal initially before transmission so that the output of the phase shifter 71 is the video signal which appears at the output of the modulating amplifier 23 of the transmitter. In the preferred embodiment of the invention, the phase shift is 180° so that the phase is completely reversed or inverted by each of the phase shifters 23 and 58. That is, the pre-phase-shifted video signal is reinstated by the phase shifter 71 due to the reversal or inversion of the already reversed or inverted video signal.

The audio signal during subscription appears at an audio terminal 72 at the transmitter and is received at an audio terminal 73 at the receiver, whence it is supplied through the telephone line. The audio signal is then fed from the terminal 73 directly to a speaker 74 at the subscriber's receiver. The audio signal may also be fed, if desired, from the terminal 73 directly to the audio amplifier 59 through the second armature 55 of the receiver control switch means. If the audio signal is fed to both the speaker 74 and the audio amplifier 59, the sound will be reproduced by the loudspeaker 61 and said speaker to provide a stereophonic sound effect. If so desired, the second armature 55 may be kept in the position shown in FIG. 4 and only the speaker 74 reproduces the sound picked up by the microphone 35 at the transmitter. The system may then be used to transmit advertising audio via the antenna 44 to extoll the virtues of the program being transmitted or the subscription system in general, or for any desired purpose. Thus, during transmission of the closed circuit program, all the audio may be transmitted directly by wire, if so desired, so that it cannot be received by non-subscribing receivers and the video is transmitted in doubly distorted form so that it cannot be reproduced by non-subscribing receivers.

When the key signal at the terminal 68 at the transmitter is to be transmitted by telephone line it is supplied through the switchboard 62 to the subscriber's telephone line and is transmitted through the telephone line and appears at the key terminal 67 at the other end of the telephone line. The key signal is supplied directly to the decoder 65 through the third armature 56 of the receiver control switch means, which armature has been moved by energization of the control relay means 54 to a position in which it contacts a second subscription terminal 75.

When the key signal is transmitted from the antenna 26 with the video signal, or from the antenna 43 with the audio signal, it is received by the antenna 44 of the receiving means and is passed through the RF selector 45 and the mixer and first picture detector 46 to the audio detector 58 which then derives the key signal and supplies it directly to the decoder 65 through the third armature 56 of the receiver control switch means, which armature is positioned in contact with the first subscription terminal 64 by energization of the control relay means 54. The key signal may comprise, of course, any suitable frequency and may modulate the audio or video signals, although it is preferably of substantially sinusoidal waveshape. The key signal carrier frequency may lie on either side of the frequency band utilized for video transmission. The key signal preferably has a frequency of 15,750 cycles per second, although it may actually be made to vary from a frequency close to but less than 15,750 cycles per second to a frequency close to but greater than 15,750 cycles per second. The permissible wobbling of the key signal frequency permits greater secrecy in the system of the present invention. The transmission of the key signal in sinusoidal form is preferred because if a non-sinusoidal form is utilized a greater bandwidth will be required and greater bandwidth may conflict with the picture video signal.

In one embodiment of the present invention, the key signal comprises a substantially sinusoidal waveshape and is transmitted at a predetermined frequency. In another embodiment of the present invention, the key signal comprises a substantially sinusoidal waveshape transmitted with an audio signal and modulated on the audio signal carrier.

Figure 6:
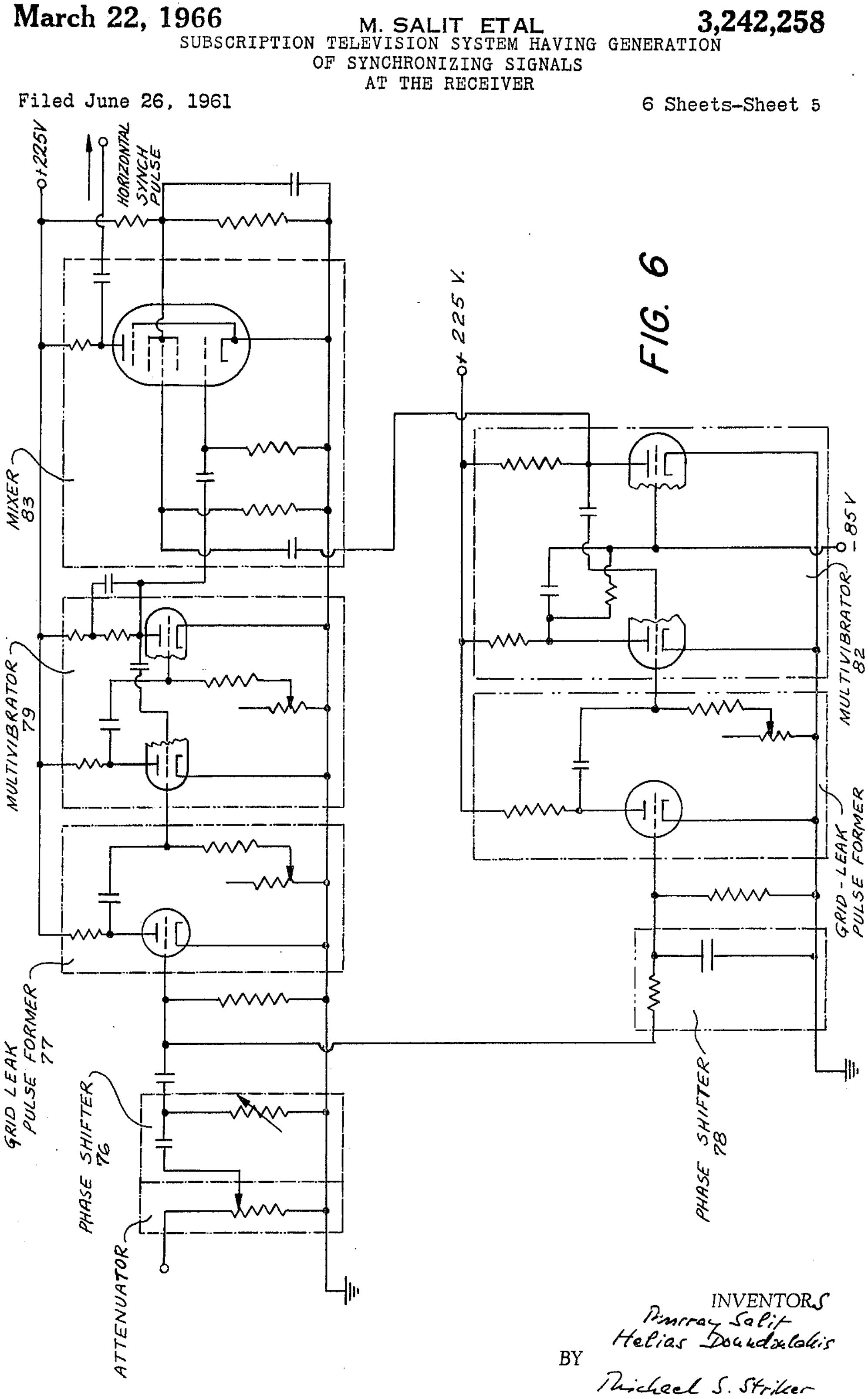
FIG. 6 is a schematic circuit diagram of an embodiment of the decoding means of FIG. 5.

Thus, when the key signal is transmitted through the air and received by the antenna 44 the input of the decoder 65 is connected between a common point between the output of the audio detector 58 and the input of the audio amplifier 59 and the output of said decoder is connected to the second picture detector 49. The decoder 65 comprises suitable means for converting the substantially sinusoidal key signal into horizontal synchronizing pulses. The decoder 65 of the present invention may comprise the system shown in FIG. 5, wherein the key signal of substantially sinusoidal waveshape is supplied to a first phase shifter 76, which, as shown in FIG. 6, may comprise a simple resistance-capacitance phase shifting network. The phase-shifted key signal is then supplied to a first pulse former 77 and to a second phase shifter 78. The first pulse former 77 preferably comprises a grid leak pulse former of the type shown in FIG. 6 and the second phase shifter 78 preferably comprises a simple resistance-capacitance circuit of the type shown in FIG. 6. The first pulse former 77 functions to convert the phase-shifted key signal from substantially sinusoidal waveshape to a first series of substantially sharp pulses. The first series of substantially sharp pulses produced by the first pulse former 77 is then supplied to a first pulse shaper 79, which converts the first series of substantially sharp pulses into a first series of substantially square pulses. The first pulse shaper 79 preferably comprises a multivibrator of the type shown in FIG. 6.

The key signal of substantially sinusoidal waveshape, which has been phase-shifted by the first phase shifter 76 and phase-shifted again by the second phase shifter 78, is then supplied to a second pulse former 81 which functions to convert the substantially sinusoidal key signal into a second series of substantially sharp pulses. The second pulse former 81 may be of similar type as the first pulse former 77 and may comprise a grid leak pulse former of the type shown in FIG. 6. The second series of substantially sharp pulses produced by the second pulse former 81 is then supplied to a second pulse shaper 82 which functions to convert the second series of substantially sharp pulses into a second series of substantially square pulses. The second pulse shaper 82 may be of similar type as the first pulse shaper 79, as shown in FIG. 6. The substantially square pulses produced by the first and second pulse shapers are designed to differ from each other in duration time and in amplitude so that when both series of pulses are combined they produce a series of horizontal synch signals. Thus, each pulse of the first series of substantially square pulses produced by the first pulse shaper 79 is of relatively greater amplitude and relatively shorter duration than that of each pulse of the second series of substantially square pulses. The first series of substantially square pulses is supplied from the first pulse shaper 79 to a mixer 83 and the second series of substantially square pulses is supplied from the second pulse shaper 82 to said mixer. The mixer 83 may comprise any suitable mixer circuit, such as, for example, a pentagrid mixer of suitable type, as shown in FIG. 6, and functions to combine the first and second series of pulses and produce a resultant series of horizontal synchronizing pulses.

The output of the decoder 65, which comprises the horizontal synch signals which were previously suppressed in the transmitter and which were not therefore received at the receiver, is then supplied to the second picture detector 49. The second picture detector 49 functions to combine the horizontal synch pulses with the video signal produced by the picture IF amplifier 47 and to produce a complete phase-inverted video signal comprising the picture information and the horizontal as well as vertical synch pulses. The complete phase-inverted video signal is then supplied to the receiver phase shifter 71 through the first armature 53 and said phase shifter inverts the complete phase-inverted video signal so that the said phase shifter produces a complete undistorted video signal which includes horizontal and vertical synch signals and which has the same phase as the signal before phase shifting in the transmitter. The output of the phase shifter 71 is supplied to the video amplifier 51 and to the synch and scanning auxiliaries 52 to produce at the picture tube 57 the picture seen by the camera 22 at the transmitter.

When the audio signal is transmitted over the air and is received by the antenna 44, the audio signal produced by the audio detector 58 is fed to the audio amplifier 59 which feeds the loudspeaker 61 to reproduce the audio signal picked up by the microphone 35 at the transmitter. In a preferred embodiment of the invention, however, the audio signal is transmitted by the telephone system. The subscriber enjoys an accurate reproduction at his receiver of the video signal and the audio signal and receives a clear and accurate picture and sound as originally transmitted by the transmitting station.

In accordance with other objects of the present invention, aside from the fact that the television communication system provided thereby is secret, the subscriber may communicate directly with a selected station by the use of suitable means provided therefore so that he may participate in the program received by him. Thus, in an educational-type program an examination may be given or in a quiz-type program questions may be asked and the subscriber is then in a position to answer such questions, whether they be of an examination nature or general nature, by suitable means provided therefor at the receiver. Such means comprise suitable signaling means 84 which may comprise, for example, a suitable power source such as a generator or battery 85 directly connected through a first switch 86 to a telephone line and connected at an intermediate point through a second switch 87 to said telephone line. Thus, when the switch 86 is closed by the subscriber, a signal of the full voltage of the power source 85 is impressed on the telephone line and appears at a terminal 88 of the telephone line. When the switch 87 is closed by the subscriber, a signal of less than full voltage of the power source 85 is supplied to the telephone line and appears at the terminal 88. The switches 86 and 87 are preferably spring-biased so that only one may be depressed at a time. Thus, when the subscriber wishes to answer a question "yes" or "true" he may depress one of the switches 86 and 87 to provide a specified voltage at the terminal 88, and when he wishes to answer a question "no" or "false" he may depress the other of the switches 86 and 87 to provide a second voltage of different magnitude from the first to the telephone line which then appears at the terminal 88.

Suitable recording means are connected at a selected station to the telephone system through the switchboard 62. The recording means or marking apparatus 89 may comprise any suitable type of known recording means and preferably makes provision for several hundreds of thousands of subscribers. This may be achieved, for example, by providing multiple tracks, each track being assigned to and identified with a specific subscriber so that when the subscriber indicates to the switchboard 62 that he wishes to subscribe to a particular program, his particular recording track will be alerted by the recording or marking apparatus 89. Then, if he answers questions put to him during the course of the subscription program, his answers will be recorded in a specified predetermined time sequence on his track in the recorder so that at some later time his answers may be evaluated and he may be advised of his comparative, relative or individual standing insofar as test results are concerned. The answers provided by the manually operated switches 86 and 87 appear at a transmitter terminal 91 of the telephone line.

Figure 7:
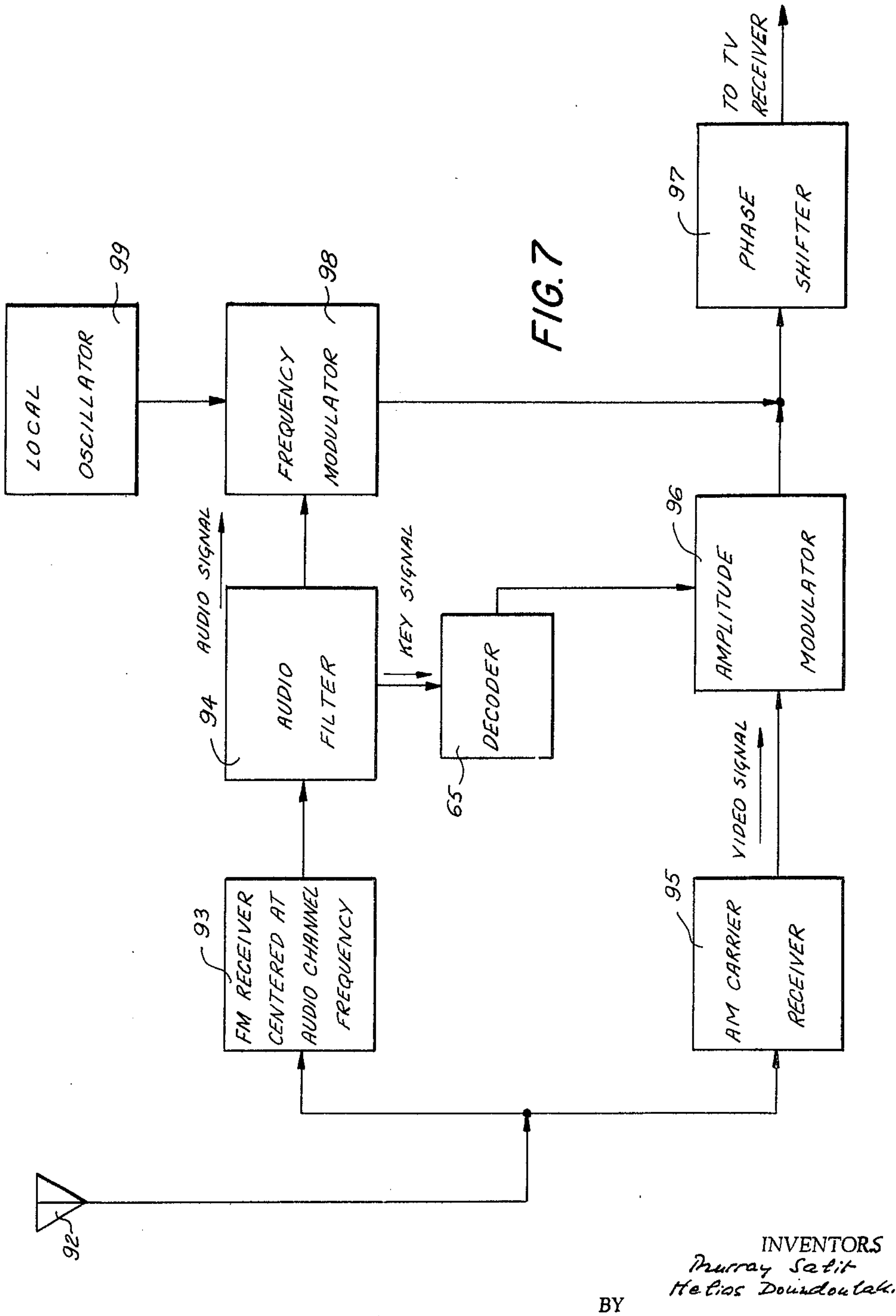
FIG. 7 is a schematic circuit block diagram of another embodiment of decoding means which may be utilized in the communication system of the present invention.

FIG. 7 shows another embodiment of decoding means which may be utilized in the television communication system of the present invention. In the embodiment of FIG. 7, the key signal comprises a substantially sinusoidal waveshape transmitted with an audio signal and modulated on an audio signal carrier. The audio signal and the key signal may be transmitted either by air and received by an antenna 92, or may be transmitted through a telephone system including a switchboard and telephone lines, as described with reference to the preceding figures, in which case these signals will be directly applied to the same point at which the antenna 92 connects to the rest of the circuit. The audio signal and the key signal are received by the antenna 92 and are supplied to an FM receiver 93 which is centered at the audio channel frequency. The FM receiver 93 may comprise any suitable type of FM receiver, such as described in the aforementioned textbooks, and serves to derive from the received signal the audio and key signals. The audio and key signals derived from the received signal by the FM receiver 93 are then supplied to an audio filter 94 which derives the substantially sinusoidal key signal from the audio signal carrier and which derives the audio signal from the audio signal carrier. The key signal derived from the audio signal carrier by the audio filter 94 is then supplied to the decoder 65 which comprises the circuit arrangement of FIGS. 5 and 6 and which functions in the described manner to convert the substantially sinusoidal key signal into horizontal synchronizing pulses of substantially square waveshape. The horizontal synch pulses produced by the decoder 65 are then combined with the output of an AM carrier receiver 95 which functions to derive the video signal from the signal received by the antenna 92. The video signal produced by the AM carrier receiver 95 and the horizontal synch pulses produced by the decoder are combined in an amplitude modulator 96 which functions to combine said signals by modulating the video signal with the horizontal synch signal to produce a complete phase-inverted video signal at its output. The complete phase-inverted video signal produced by the amplitude modulator 96 is then combined with the audio signal and is supplied to a phase shifter 97 and said phase shifter inverts the complete phase-inverted video signal so that the said phase shifter produces a complete undistorted video signal which includes horizontal and vertical synch signals and which has the same phase as the signal before phase shifting in the transmitter. The output of the phase shifter 97 is supplied to a TV receiver. The audio signal produced by the audio filter 94 is supplied to a frequency modulator 98 which is fed by a local oscillator 99 so that the frequency modulated audio signal, complete as initially transmitted, is reproduced. The frequency modulated audio signal produced by the frequency modulator 98 is combined with the video signal produced by the amplitude modulator 96 and the combined resultant signal is fed through the phase shifter 97 to the TV receiving set. It is thus seen that the converting means which comprises the entire circuit arrangement of FIG. 7 of the embodiment of FIG. 7 may be connected between the antenna 92 and the entire receiver set of the subscriber.

The frequency modulator 98 serves to modulate a second audio signal carrier provided by the local oscillator 99 with the derived audio signal from the audio filter 94 to produce the resultant audio signal which is applied with the resultant video signal through the phase shifter 97 to the receiving set.

When the subscriber wishes to subscribe to a program, he may do so by dialing a predetermined code number on his telephone thereby communicating with the automatic type switchboard 62 and alerting said switchboard to the fact that his control and audio circuits should be closed or are closed. Of course, a human operator such as a telephone operator may be utilized instead of the automatic switchboard but it is preferred to use automatic telephone switchboards to handle the huge volume of subscribers that may require service at any time.

It is thus seen that the television communication system of the present invention provides very tight security for video and audio transmission to subscribers and is therefore especially well suited for closed circuit transmission of medical, surgical and the like programs for educational, professional and other programs. Furthermore, the television communication system of the present invention transmits and may be utilized to transmit educational and/or other types of subscriber participation programs and for subscriber participation in such programs. The signaling equipment 84 provided at the receiver permits the subscriber to answer questions presented during the program and the recording equipment 89 provided at a selected station permits the recording of the answers to permit subsequent evaluation of the answers of the subscriber so that a complete educational course may be given by this means.

Although for the purposes of clarity of illustration and clarity of disclosure a single receiving station is indicated in FIG. 4, it is realized, of course, that a plurality of receiving stations are connected to a transmitting station through the telephone type switchboard 62 and through a plurality of telephone lines as indicated by the extra telephone lines 101 indicated in FIG. 3. Each of the receiving stations may comprise the receiving means indicated in FIG. 4. Of course, several hundred thousand receiving sets may be included in the system, each of which will include the components of FIG. 4; the great number of receiving sets being accommodated through the automatic switchboard means 62.

It is thus seen that the transmitting station is not disrupted from its normal operation due to the inclusion of the horizontal synch signal suppresor 12, the transmitter phase shifter 27, or the control or switch means utilized for the communication system of the present invention, and that the receivers are not disrupted from normal operation due to the inclusion of the decoder 65, the key signal converter including such decoder, the receiver phase shifter 71, or the control relay or switch means. The transmitting and receiving means do not require reconstruction to enable transmission and reception of subscription programs, and neither the owners of TV sets nor the transmitter operator are inconvenienced by the structure or operation of the subscription system. The modifications of existing equipment required for the subscription system are minor ones and include readily installable standard type equipment. The utilization of telephone lines for the audio transmission during the subscription, if desired, makes the use of the communication system of the present invention exceedingly simple, although reliable and efficient and permits direct communication with each subscriber through the central point such as indicated by the switchboard 62. The switchboard 62 and the telephone lines are part of the telephone system which may already be in existence and which may be leased or purchased or utilized in the closed circuit TV system of the present invention.

From the foregoing it will be clear that the present invention comprises not only a tight security secret television communication system, but a method for secret television communication. The method of the present invention comprises, in one embodiment, the steps of transmitting from a transmitting station a wireless video and an audio signal of a frequency within the audible frequency range synchronized with the video signal. The method of the present invention of the first embodiment further includes suppressing horizontal synchronizing signals and replacing the horizontal synchronizing signals with a key signal and shifting the electrical phase of the video signal before transmission so as to distort the video signal transmitted from the transmitting station; receiving and reproducing at a receiving station the key signal, the video signal and the audio signal in synchronism with the video signal; and reconstituting the horizontal synchronizing signals from the received key signal so as to provide in the receiving station a video signal including the horizontal synchronizing signals and shifting the electrical phase of the received signal so as to nullify the effect of the phase shifting at the transmitting station and reinstate in the receiving station the video signal produced in the transmitting station before phase shifting thereof.

In another embodiment, the method of the present invention comprises the steps of suppressing horizontal synchronizing signals and replacing the horizontal synchronizing signals with a key signal of substantially sinusoidal waveshape frequency modulated on an audio signal carrier and shifting the electrical phase of the video signal before transmission so as to distort the video signal transmitted from the transmitting station; receiving at a receiving station the video signal and the audio signal in synchronism with the video signal; deriving the key signal from the audio signal carrier; deriving the audio signal from the audio signal carrier; converting the key signal into horizontal synchronizing pulses; modulating the video signal with the horizontal synchronizing pulses to provide a resultant video signal; modulating a second audio signal carrier with the derived audio signal to produce a resultant audio signal; shifting the electrical phase of the resultant video and audio signals so as to nullify the effect of the phase shifting at the transmitting station and reinstate in the receiving station the video signal produced in the transmitting station before phase shifting thereof; and applying the phase-shifted resultant video and audio signals to picture and audio reproducing means at the receiving station.

It is obvious, of course that the key signal may be transmitted at any desired frequency in the high or low frequency range of a standard TV channel, either directly or modulated either in an FM or AM manner so long as it does not interfere with the video or audio signals. The key signal is transmitted as a continuous frequency, utilizing part of the available channel bandwidth; the frequency, phase and relative amplitude of the horizontal synchronizing pulses being indicated thereby. When the audio signal is transmitted by telephone line, the FM portion of the channel bandwidth may be utilized for the transmission of the horizontal synch frequency. The key signal may, however, be transmitted at any suitable frequency.

It is also obvious that the control signal from the control signal source 32 and/or signals from the signalling means 84 may comprise signals of any suitable polarity or frequency. Thus, for example, the control signal may comprise a D.C. signal or a 1000 cycle A.C. signal and the signals from the signalling means 84 may comprise positive and negative polarity signals, respectively, different level D.C. signals, respectively, or respective signals of, for example, 500 cycles and 750 cycles. The embodiment of FIGS. 3 and 4 is preferred, however, due to its simplicity and reliability.

Furthermore, the audio, control and key signals may all be transmitted over a single telephone line, although several lines are shown in FIGS. 3 and 4 in order to enhance the clarity of presentation of the system of the present invention. Also, the key signal may be utilized as a control signal, when said key signal is transmitted by telephone line. In the preferred embodiment of the invention, however, the key signal is transmitted by antenna and the control signal is transmitted by telephone line.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by the Letters Patent is:

1. In a television receiver, in combination, receiving means for receiving and reproducing a video signal and a key signal of substantially sinusoidal waveshape, said receiving means including picture detecting means for deriving the picture signal from a received video signal, means connected to said picture detecting means for reproducing a picture from the output of said picture detecting means, synchronizing and scanning means connected to said picture reproducing means, and receiver audio means for receiving and reproducing an audio signal in synchronism with said video signal, said receiver audio means comprising audio detecting means for deriving said audio signal from the received signal and means for reproducing said audio signal from the output of said audio detecting means; and decoding means for producing horizontal synchronizing signals from the received key signal so as to provide in said receiver a video signal including said horizontal synchronizing signals, said decoding means having an input connected to a common point between said audio detecting means and said audio signal reproducing means and an output connected to said picture detecting means, said decoding means including receiver phase shifting means for phase inverting the received video signal, said receiver phase shifting means being adapted to be connected between said picture detecting means and said picture reproducing means, said decoding means comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube.

2. In a television receiver, in combination, receiving means for receiving and reproducing a video signal and a key signal comprising a substantially sinusoidal waveshape transmitted with an audio signal modulated on an audio signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and decoding means for producing horizontal synchronizing signals from the received key signal so as to provide in said receiver a video signal including said horizontal synchronizing signals, said decoding means including receiver phase shifting means for phase inverting the received video signal, said decoding means having an input connected to said antenna means and an output connected to said receiving means, said decoding means comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

3. In a television system, in combination, transmitting means for transmitting a video signal, said transmitting means including transmitter audio means for simultaneously transmitting an audio signal of a frequency within the audible frequency range synchronized with said video signal; transmitter encoding means comprising means for suppressing horizontal synchronizing signals with a key signal of substantially sinusoidal waveshape and transmitter phase shifting means for phase shifting the electrical phase of the video signal before transmission so as to distort the video signal transmitted by said transmitting means; receiving means for receiving and reproducing said video signal and said key signal, said receiving means including picture detecting means for deriving the picture signal from the received video signal, means connected to said picture detecting means for reproducing a picture from the output of said picture detecting means, synchronizing and scanning means connected to said picture reproducing means, and receiver audio means for receiving and reproducing an audio signal in synchronism with said video signal, said receiver audio means comprising audio detecting means for deriving said audio signal from the received signal and means for reproducing said audio signal from the output of said audio detecting means; and receiver decoding means comprising means for reconstituting said horizontal synchronizing signals from the received key signal and receiver phase shifting means for shifting the electrical phase of the received video signal so as to nullify the effect of said encoding means and provide in said receiving means the video signal produced in said transmitting means before phase shifting thereof and including said horizontal synchronizing signals, said decoding means having an input connected to a common point between said audio detecting means and said audio signal reproducing means and an output connected to said picture detecting means, said decoding means comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series af substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube.

4. In a television system, in combination, transmitting means for transmitting a video signal, said transmitting means including transmitter audio means for simultaneously transmitting an audio signal of a frequency within the audible frequency range synchronized with said video signal; transmitter encoding means comprising means for suppressing horizontal synchronizing signals and replacing said horizontal synchronizing signals with a key signal and transmitter phase shifting means for shifting the electrical phase of the video signal before transmission so as to distort the video signal transmitted by said transmitting means, said key signal comprising a substantially sinusoidal waveshape transmitted with said audio signal modulated on an audio signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means comprising means for reconstituting said horizontal synchronizing signals from the received key signal and receiver phase shifting means for shifting the electrical phase of the received video signal so as to nullify the effect of said encoding means and provide in said receiving means the video signal produced in said transmitting means before phase shifting thereof and including said horizontal synchronizing signals, said decoding means having an input connected to said antenna means and an output connected to said receiving means, said decoding means comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

References Cited by the Examiner

UNITED STATES PATENTS

| | | | |
|---|---|---|---|
| 2,510,046 | 5/1950 | Ellett | 178—5.1 |
| 2,573,349 | 10/1951 | Miller | 178—5.1 |

DAVID G. REDINBAUGH, *Primary Examiner.*

ROY LAKE, *Examiner.*